June 29, 1965 D. D. M. STREED ETAL 3,192,294
METHOD OF MOLDING VINYL RESIN SHEET MATERIAL
HAVING AN EMBOSSED SURFACE
Filed June 21, 1962
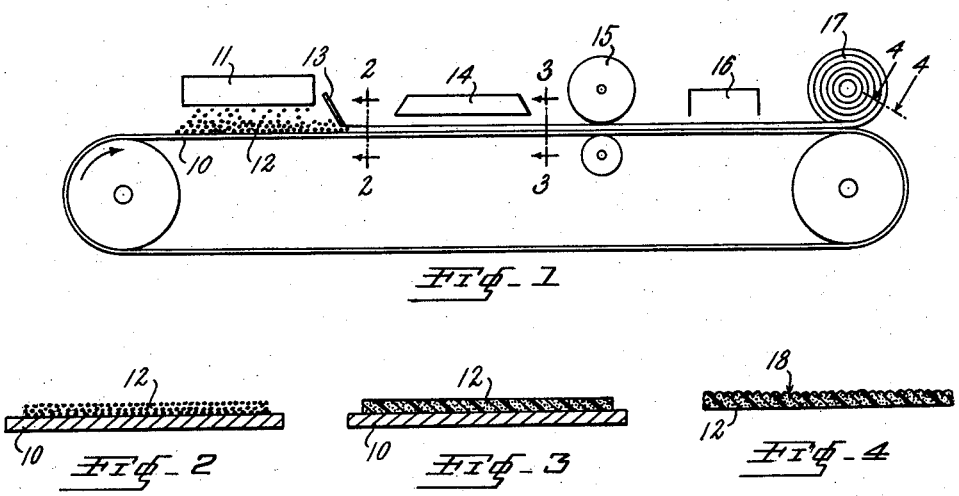
INVENTORS
DAVID D. M. STREED
STANTON GLOVER United States Patent Office 3,192,294
Patented June 29, 1965

3,192,294
METHOD OF MOLDING VINYL RESIN SHEET MATERIAL HAVING AN EMBOSSED SURFACE
David D. M. Streed, South Bend, Ind., and Stanton Glover, Naugatuck, Conn., assignors to United States Rubber Company, New York, N.Y., a corporation of New Jersey
Filed June 21, 1962, Ser. No. 204,102
8 Claims. (Cl. 264—54)

This invention relates to a method of making plastic sheet material having deep embossing and more particularly it relates to a method of making a carpet or the like, from vinyl resin or similar thermoplastic resin, having a deeply textured surface such as a surface reminiscent of pile carpeting.

Flexible plastic materials have many characteristics which make them desirable for use as floor coverings. However, if it is attempted to make, from such plastic material in sheet form, a carpet or mat having a pleasing or decorative surface appearance in the form of relatively deep pile effects or the like, it is found that the plastic is not susceptible of receiving such effects by a conventional roll embossing operation. Therefore, resort must be had to techniques that are relatively more expensive and cumbersome than a roll embossing operation.

Accordingly, it is an object of the invention to provide plastic sheet materials having deep texture effects, such as pile effects, by a relatively inexpensive and convenient novel method involving embossing.

In one important aspect, the invention has for its object the making of plastic sheet material of the kind described without necessity for using the conventional heavy processing equipment, such as Banbury mixers, roll mills, and calenders, usually associated with the manufacture of plastic sheets.

Still another object is the manufacture of plastic carpeting or similar sheet goods from dry blended plastic material.

Yet a further object of the invention is to make plastic carpeting by a method which lends itself to deep engravings.

It is an additional object to provide a method of making plastic carpeting or mats having multi-color effects, such as salt and pepper effects, not only on the surface but throughout the thickness of the carpeting or mats.

Still another object is to provide a method of the kind described which lends itself to employment of scrap fused thermoplastic material.

The invention will be described with reference to the accompanying drawing, wherein:

FIG. 1 is purely diagrammatic longitudinal sectional elevation of conveying and embossing means useful in practicing one embodiment of the invention;

FIG. 2 is a transverse sectional view, on an enlarged scale, taken along line 2—2 of FIG. 1, showing powdered resin deposited on the conveying means;

FIG. 3 is a similar view, taken along line 3—3 of FIG. 1 showing the appearance after sintering the powder to form a sheet; and, FIG. 4 is a similar view, taken along the line 4—4 of FIG. 1 of the final, embossed product.

The invention is based on the surprising and unexpected discovery that plastic sheets having relatively deep, relatively closely spaced, embossed effects are readily produced by first depositing particles of plastic, on a plane surface, sintering the particles to form a sheet, and then embossing the thus-formed sheet. For some reason, the sheet of sintered plastic particles readily takes a deep, closely spaced embossed pattern, whereas an ordinary conventional prefused sheet of plastic (made for example by calendering or casting), under the same embossing conditions, refuses to flow into or conform to, the deeply relieved grooves or pits or the like of the embossing surface. While it is not desired to limit the invention to any particular theory of operation, it is believed that the reason why an ordinary homogeneous, prefused plastic sheet will not take such deep embossing is that, even at elevated temperatures at which the material is relatively soft, profound stresses are imposed on the sheet during the embossing. These stresses presumably tend to restrict deformation of the surface of the sheet, thereby preventing the material from receiving the full depth of embossing. On the other hand, the sintered particles seem to be easily compressed into the relatively fine, deep depressions of the embossing surface during the embossing step; as a consequence the desired deep texture is readily imparted to the surface with surprising ease. This may be at least in part a result of the fact that there may remain, in the heated, sintered sheet, slight lines of weakness between adjacent sintered particles that enable the particles to be displaced more readily with respect to each other during the embossing. This facility for displacement or relative movement of the sintered particles may account for the ease with which the sintered sheet will take deep embossing, in comparison to a conventional homogeneously fused calendered or cast sheet. The particles employed in the present method are smaller than the openings or passages in the surface of the embossing roll, so that such particles readily pass into the openings or passages.

In one aspect, the invention is directed to the manufacture of imitation pile carpeting or mats from thermoplastic vinyl resin, in which category we include not only such vinyl resins as vinyl chloride homopolymer itself but also equivalent copolymers of vinyl chloride with other copolymerizable monomers, e.g., up to 25% or more of vinyl acetate, dialkyl maleates, or similar monoethylenically unsaturated materials. In accordance with an essential feature of the invention, such thermoplastic resin, or a plurality of such resins, is employed in particulate or powdered form. The particles used almost invariably pass through a sieve having about 0.125 inch openings, but the particles must not be too fine, that is, the mean particle size is preferably not less than about 0.0006 inch (about 15 microns). However, in certain cases it is possible to employ a limited quantity of resin, for example up to 20% based on the entire weight of resin, in the form of finer powder, say particles of about 2 microns mean particle size.

For purposes of the invention the resin particles are mixed or compounded with other desired compounding ingredients (usually stabilizers, plasticizers, pigments, blowing agent if desired, fungicides, and the like) by what is known as dry blending, that is, the resin powder is simply tumbled together with the other ingredients without heat, producing a more or less free flowing powdered blend in which the ingredients are all uniformly distributed together. In the dry blend some of the added ingredients exist as small particles interspersed with the resin particles and some of the added ingredients exist as a kind of coating on the resin particles. Liquid plasticizer added in the dry blending exists essentially as a kind of coating absorbed on the surfaces of the resin particles; however there is not such a large amount of plasticizer present and the resin particles are not on the average so small or fine as to form a fluid or pasty mix resembling a plastisol. Instead, the mix remains a superficially dry, powdered material, more or less freely flowing, at least to the extent that damp sand, for example, is more or less free flowing, but certainly not mud-like or paste-like. In the present dry mix the individual particles are readily discernable and separable, whereas a plastisol is a paste or fluid not separable into individual particles. Plastisols are prepared from finely powdered resins (1½ to 2 microns) and do not employ the relatively large particles essential in the present invention. In the present dry mix the amount of liquid plasticizer present is not more than about 65 parts per 100 parts by weight of resin, and is usually less. Plastisols can have much larger amounts of plasticizer.

In practicing the invention the dry blended powdered resin is spread out as indicated on a suitable plane surface to which the resin is non-adherent, to a thickness many times deeper than the individual particles, which thickness is slightly greater than the thickness of the finally desired sheet. Such a layer of powder may be applied with the aid of a vibrating screen or similar device capable of depositing the more or less damp resin particles of the dry blend; the deposited layer may be distributed more evenly and smoothed out with the aid of rakes or fingers, spreader bars, or similar hand manipulated or mechanically operated devices. If desired the layer may be compacted somewhat by application of slight pressure, for example by lightly pressing a non-adherent compacting roll or belt against the surface of the layer. The spread-out layer of powder is then heated to an elevated temperature, in excess of the softening temperature of the resin, whereupon the particles of resin sinter together at their contacting surfaces or melt together slightly where they touch so that they form a coherent sheet. No applied pressure or confinement is used or required to effect this sintering, that is, the layer of particles is simply freely exposed to the ambient atmosphere of the oven or other heating device in which the sintering is effected. During the sintering the plasticizer forms a solution with the resin at the surfaces of the resin particles; the other ingredients present (e.g., stabilizer, pigments) dissolve in or are embedded or suspended in such solution. However, the sintered powdered resin sheet is not heated to such a high temperature or for such a prolonged period of time that it becomes essentially a completely homogeneously fused sheet equivalent to a calendered, fused sheet or equivalent to a sheet cast from a solution or plastisol and subsequently fused. Instead, the present sintered powdered sheet is not completely homogeneous. However, if cooled at room temperature at this stage, and removed from the non-adherent supporting base on which it was made, the sintered sheet would be a coherent, self-sustaining flexible sheet having a certain amount of tensile strength (although not nearly as high a tensile strength as a completely homogeneously fused sheet such as would result from a typical calendering or plastisol fusing operation). At this stage, the sintered sheet of particles typically has a surface that is slightly uneven in appearance and slightly rough to the touch. Here and there small voids can be seen on the surface, and if the sheet is cut open, small voids can be seen here and there in the interior also. These voids represent spaces between the particles that were not completely filled up by flow of resin during the sintering.

While the sheet of sintered particles is in the foregoing heated condition it is subjected to the action of an embossing roll or the like, having on its surface a relief design or configuration that is typically relatively deep (e.g., 0.06 inch to 0.1 inch deep, depending on the thickness of the sheet material being produced) and typically relatively "fine" that is, the width of the openings on the surface of the embossing roll may typically be only 1/32 to 1/8 inch. Such embossing would be difficult or impossible to impress properly on a conventional homogeneous, prefused vinyl sheet. When the heat-softened sheet of sintered vinyl particles is brought against the surface of the embossing roll under pressure, the sintered particles flow readily through the fine openings on the surface of the embossing roll and easily fill in the fine passages to their entire depth. The embossing surface is preferably cooled to a temperature below the softening temperature of the resin, for example by passing cooling water through the interior of the embossing roll, in order to aid in fixing the thus-imparted pattern in the surface of the plastic. Upon cooling, the thus-embossed sheet retains the texture imparted by the embossing roll.

In a preferred aspect the invention contemplates the inclusion, in the vinyl resin dry mix formulation from which the particles are made, of a suitable blowing agent, such as azodicarbonamide, or other substance capable of generating gases within the plastic when subjected to elevated temperature. The blowing agent is incorporated into the formulation for the particles simply by dry blending, without any necessity for milling or the like. During the sintering operation, a sufficiently elevated temperature is developed to decompose the blowing agent (e.g., a temperature of at least about 280° F. in the case of azodicarbonamide in a typical vinyl formulation) with the result that the particles develop small internal pores or voids, thus imparting a certain amount of foam-like or sponge structure to the particles. It will be understood that during the sintering operation there is at first a certain amount of flow or resin/plasticizer solution which embeds or entraps the particles of blowing agent (and in fact the blowing agent may dissolve in such solution). The particles of blowing agent thus in effect become surrounded by or embedded in plasticized resin before the particles have had an opportunity to decompose. Continued application of heat causes the blowing agent to decompose and liberate gas which causes the blowing of the composition. This has the desirable effect of increasing the softness or springiness underfoot of a carpet or the like made in this manner. The blowing improves the "hand" of the material, decreases its density, and tends to produce a more desirable "craggy" structure (i.e., a kind of enhancement of the embossing effect).

It is a remarkable advantage of the present method of making plastic carpeting that no backing material (previously formed plastic sheet or fabric) is required.

Perhaps one of the most interesting applications of the invention resides in the production of salt-and-pepper or other multicolor effects. Thus, salt and pepper or splatter effects may be obtained by preparing a dry blend resin powder formulation, dividing it into two parts, adding one pigment to one part and a differently colored pigment to the other part. The resulting two differently colored powders may then be scattered at random or in a controlled manner on the conveyor belt (or on the base vinyl sheet if one is used), producing interesting multicolored effects in the final product. Decorative effects may be obtained by using a base sheet of contrasting color to the particles. A transparent base sheet may be used, and/or some or all of the particles may be substantially transparent or variously colored. Colored powders made by pulverizing or grinding previously fused pigmented plasticized vinyl resin compositions may be sprinkled on a deposited layer of the dry blend, before the heat sintering step. Even ground colored scrap plastic (which is in reality a prefused thermoplastic resin composition, may be employed, either in addition to the described dry blend, or as a substitute for some or all of the dry blend. If necessary additional plasticizer may be blended with such scrap, converting it in effect into a dry blend of the kind described.

Various coatings or surface films may be incorporated in the product of the invention. For example, the surface of the carpeting may be sprayed or otherwise coated with a lacquer or the like based on acrylic resin or other suitable film-forming material. The carpeting may be overlaid with a thin film (e.g., 0.01 inch thick) of vinyl resin, which film may for example be placed on the surface prior to the embossing. Such coatings or surfaces serve particularly as release surfaces and enhance the cleanability of the carpeting.

The following example, in which all parts are expressed by weight unless otherwise indicated, will serve to illustrate the practice of the invention in more detail.

*Example I*

The following formulation is dry blended:

| Ingredients: | Parts by weight |
|---|---|
| Powdered polyvinyl chloride resin (average particle size 15 microns) | 90 |
| Powdered vinyl chloride: dibutyl maleate (90:10) copolymer resin (average particle size 2 microns) | 10 |
| Polymeric plasticizer [e.g., polyester type, such as poly(ethylene glycol sebacate), Industrial and Engineering Chemistry, vol. 37, page 504, 1945, or epoxidized soybean oil] | 8 |
| Non-polymeric type plasticizers: | |
| E.g., octyl benzoate | 18 |
| Phthalate ester type (e.g., dioctyl phthalate) | 32 |
| Stabilizers (e.g., barium stearate, cadmium stearate, zinc octoate, etc.) | 5.5 |
| Stearic acid | 0.38 |
| Filler (e.g., silica, calcium carbonate, etc.) | 31.4 |
| Blowing agent (e.g., nitrogen type, such as azodicarbonamide) | 1.0 |

The resulting mixture is essentially a free-flowing powder. A suitable non-adherent continuously advancing belt 10 (FIG. 1), made for example from glass fabric (or polyester fabric) coated with polytetrafluoroethylene, passes under a shaking device 11 which deposits a quantity of the above described powdered vinyl resin dry blend 12, in an unheated condition, on the upper surface of the belt 10. A spreader bar 13 or the like extending transversely of the path of travel of the belt and spaced slighlty above the upper surface of the belt by an appropriate distance serves to level the layer of particles 12 at a desired depth, in this case, for example about 0.1 inch. The quantity of dry powder thus deposited may be, for example, approximately 3.6 to 3.8 pounds per square yard of belt surface covered. The belt 10 with the powdered resin layer 12 thereon then passes beneath a suitable heating device 14 which serves to raise the temperature to about 400° F., which is sufficient to soften the particles, whereby the particles sinter together and become welded or bonded to each other at their contacting surfaces, forming a rather grainy but coherent sheet as previously described. However, the heating of this stage is not so severe or so prolonged as to actually fuse the particles to the extent that they melt completely, that is, the particles do not form a continuous, uniformly fused sheet that is as homogeneous as an ordinary calendered or cast sheet which is completely and thoroughly fused in the course of its manufacture.

After the sintering operation has proceeded for a time the blowing agent reaches its decomposition temperature and begins to liberate gas, thereby causing the sintered sheet to blow or expanded, that is, to form internal voids in the form largely of intercommunicating cells. While still in this heated condition, the assembly passes under and into pressurized contact with an embossing roll 15 having the desired relief configuration engraved or otherwise formed in its surface. The embossing roll is cooled internally with running water, so that it has a surface temperature of approximately 150° F., which is below the softening range of the vinyl resin composition. After passing from under the embossing roll 15, the thus-embossed sheet is subjected to the action of a cooling device 16, such as a device for blowing air against the surface of the sheet, and after the sheet has thus been sufficiently cooled it may be separated from the non-adherent carrier belt 10 and wound up into a roll 17.

The condition of the powder 12 after application to the belt 10 and before the heating is represented in FIG. 2; the condition of the sheet after the sintering or heating and before the embossing is represented in FIG. 3, while the condition subsequent to embossing and after removal from the belt is illustrated in FIG. 4, which shows the embossed detail 18.

From the foregoing it will be apparent that the invention has many advantageous features. By proceeding as described, it is possible to emboss vinyl or similar thermoplastic material, in sheet form or other convenient form, with exceptionally deep and finely detailed embossing, such as could not ordinarily be imparted particularly in a continuous embossing operation. The adaptability of the process to continuous operation is particularly advantageous from the standpoint of efficiency and reproducibility of results. The invention makes it possible to produce numerous functional and decorative effects, by suitable variations in the nature of the embossing. Not only can pile fabric be imitated, but other effects, including sculptured effects, can be produced by suitable local variations in the character of the embossing. If desired, certain areas may be left unembossed to present a desired appearance. Interesting multicolored effects may be obtained in the manner described. Effects similar to those heretofore produced by relatively slow and cumbersome molding operations can be quickly and conveniently achieved continuously by the present method. The present method does not require the use of fabric to produce the desirable pile-like effect.

Because no previously prepared vinyl base sheet is used, the invention is particularly economical and convenient since it requires no large capital investment in conventional vinyl sheet-making equipment, such as calenders or plastisol-casting devices; an operator having no such equipment can readily practice the present invention without going to the expense of purchasing previously prepared vinyl sheet. In the preferred form of the invention cheap and readily available powdered resin is easily and quickly converted into a flexible sheet by the sintering method described. In fact, ground up scrap thermoplastic resin may be used in the invention, as indicated.

Having thus described our invention, what we claim and desire to protect by Letters Patent is:

1. A method of making a vinyl sheet comprising dry blending vinyl resin with a particulate blowing agent, spreading the blend into a thin layer on a temporary supporting surface, sintering the blend at a temperature sufficiently elevated to fuse the vinyl resin and decompose the blowing agent, embossing the surface of the sheet deeply to provide a pile fabric effect, and removing the sheet from the supporting surface, the said embossing being done by an embossing roll maintained at a temperature below the softening range of the resin, said roll having surface openings from 0.06 to 0.1 inch deep and from 1/32 to 1/8 inch wide to form said pile.

2. A method of making a plastic sheet comprising preparing a dry blend of thermoplastic resin particles and liquid plasticizer, spreading said dry blend into a thin layer, sintering the layer by heating it while supported on a temporary non-adherent backing and freely exposed to the ambient atmosphere to form a coherent sheet, and embossing the surface of the sheet deeply to provide a pile fabric effect, the said embossing being done by an embossing roll maintained at a temperature below the softening range of the resin, said roll having surface openings from 0.06 to 0.1 inch deep and from 1/32 to 1/8 inch wide to form said pile.

3. A method of making a vinyl resin floor covering having a surface resembling pile fabric comprising depositing a layer of dry, unheated, substantially free-flowing vinyl resin particles on a temporary supporting non-adherent base, heating the layer to the softening temperature of the vinyl resin, whereby the particles sinter together to form a coherent sheet, thereafter embossing a surface of said sheet while cooling the said surface, subsequently cooling the embossed sheet and removing it from the temporary base, the said embossing being done by an embossing roll maintained at a temperature below the softening range of the resin, said roll having surface openings from 0.06 to 0.1 inch deep and from 1/32 to 1/8 inch wide to form said pile.

4. A method as in claim 3, in which the particles are mixed with a particulate blowing agent prior to application to said base, and the temperature during said sintering is sufficient to decompose said blowing agent.

5. A method of making a vinyl resin floor covering having a surface resembling pile fabric comprising preparing a dry blend of vinyl resin particles and liquid plasticizer, depositing a layer of said dry blend on a temporary supporting non-adherent base, heating the layer to the softening temperature of the vinyl resin, whereby the particles sinter together to form a coherent sheet, thereafter embossing a surface of said sheet with a design resembling pile fabric while cooling the said surface, subsequently cooling the embossed sheet and removing it from the temporary base, the said embossing being done by an embossing roll maintained at a temperature below the softening range of the resin, said roll having surface openings from 0.06 to 0.1 inch deep and from 1/32 to 1/8 inch wide to form said pile.

6. A method of making a vinyl floor covering having a surface resembling pile fabric comprising preparing a dry blend of vinyl resin particles, liquid plasticizer, and a particulate blowing agent, depositing a layer of said dry blend on a temporary supporting non-adherent base, heating the layer to the softening temperature of the vinyl resin whereby the particles sinter together to form a coherent sheet, the said heating also serving to decompose said blowing agent to expand said sheet, thereafter embossing a surface of said sheet with a design resembling pile fabric while cooling the said surface, subsequently cooling the embossed sheet and removing it from the temporary base, the said embossing being done by an embossing roll maintained at a temperature below the softening range of the resin, said roll having surface openings from 0.06 to 0.1 inch deep and from 1/32 to 1/8 inch wide to form said pile.

7. A method of making a multicolored vinyl resin floor covering having a surface resembling pile fabric comprising providing a plurality of batches of particulate vinyl resin, each batch having a desired color, depositing said batches in intermingled fashion to form a multicolored layer of particles, heating the layer to the softening temperature of vinyl resin whereby the particles sinter together to form a coherent sheet, thereafter embossing a surface of said sheet with a design resembling pile fabric while cooling the said surface, and subsequently cooling the thus-embossed sheet, the said embossing being done by an embossing roll maintained at a temperature below the softening range of the resin, said roll having surface openings from 0.06 to 0.1 inch deep and from 1/32 to 1/8 inch wide to form said pile.

8. A method as in claim 7 in which said batches of particulate resin particles contain a particulate blowing agent, and said blowing agent is decomposed within the sintered sheet to expand such sheet.

References Cited by the Examiner
UNITED STATES PATENTS

| | | | |
|---|---|---|---|
| 2,605,506 | 8/52 | Miller | 264—126 XR |
| 2,987,104 | 6/61 | Benedict | 264—28 |
| 3,012,901 | 12/61 | Reese | 264—112 |
| 3,054,146 | 9/62 | Griffin | 264—50 |

ALEXANDER H. BRODMERKEL, *Primary Examiner.*